United States Patent
Subramani Jayavelu et al.

(10) Patent No.: US 11,716,377 B2
(45) Date of Patent: Aug. 1, 2023

(54) FAST PROVISIONING OF MACHINES USING NETWORK CLONING

(71) Applicant: VMware, Inc., Palo Alto, CA (US)

(72) Inventors: Giridhar Subramani Jayavelu, San Francisco, CA (US); Sidharth Surana, San Jose, CA (US); Subrahmanyam Bolla, Belmont, CA (US)

(73) Assignee: VMWARE, INC., Palo Alto, CA (US)

(*) Notice: Subject to any disclaimer, the term of this patent is extended or adjusted under 35 U.S.C. 154(b) by 77 days.

(21) Appl. No.: 17/508,886

(22) Filed: Oct. 22, 2021

(65) Prior Publication Data

US 2023/0125912 A1 Apr. 27, 2023

(51) Int. Cl.
*H04L 67/10* (2022.01)
*H04L 61/5014* (2022.01)

(52) U.S. Cl.
CPC .......... *H04L 67/10* (2013.01); *H04L 61/5014* (2022.05)

(58) Field of Classification Search
CPC .......................... H04L 67/10; H04L 61/5014
USPC ........................................................ 709/201
See application file for complete search history.

(56) References Cited

U.S. PATENT DOCUMENTS

| | | |
|---|---|---|
| 10,326,655 B1 | 6/2019 | Sait et al. |
| 10,469,330 B1 | 11/2019 | Roth et al. |
| 11,010,191 B1 | 5/2021 | Hornbeck |
| 11,134,058 B1 | 9/2021 | Sole et al. |
| 11,190,609 B2 | 11/2021 | Siefker et al. |
| 11,218,421 B1 | 1/2022 | Khan et al. |
| 11,252,084 B1 | 2/2022 | Cai et al. |
| 11,336,570 B1 | 5/2022 | N et al. |
| 11,340,837 B1 | 5/2022 | Vohra et al. |
| 11,392,402 B1 | 7/2022 | Carroll |
| 11,397,650 B1 | 7/2022 | Palaiah et al. |
| 11,412,051 B1 | 8/2022 | Chiganmi et al. |
| 2011/0075667 A1* | 3/2011 | Li .......................... H04L 45/04 370/392 |
| 2012/0266231 A1* | 10/2012 | Spiers ................... H04L 9/3234 726/12 |
| 2014/0337500 A1* | 11/2014 | Lee ....................... H04L 41/122 709/223 |
| 2016/0274951 A1 | 9/2016 | Koizumi |
| 2017/0180423 A1 | 6/2017 | Nimmagadda et al. |
| 2017/0208037 A1 | 7/2017 | Hay et al. |

(Continued)

OTHER PUBLICATIONS

Non-Published Commonly Owned Related U.S. Appl. No. 17/508,892 with similar specification, filed Oct. 22, 2021, 30 pages, VMware, Inc.

*Primary Examiner* — Wing F Chan
*Assistant Examiner* — Leon Y Tseng
(74) *Attorney, Agent, or Firm* — Adeli LLP (57) ABSTRACT

Some embodiments of the invention provide a method for cloning a set of one or more applications implemented by a first set of machines connected through a first logical network that defines a virtual private cloud in a set of one or more datacenters. The method instantiates a cloned, second set of machines that is a replicated copy of the first set of machines. The method identifies a set of network configuration data that configures a set of logical forwarding elements (LFEs) of the first logical network. The method uses the identified set of network configuration data to define a cloned, second logical network to connect the cloned, second set of machines.

20 Claims, 8 Drawing Sheets

(56) References Cited

U.S. PATENT DOCUMENTS

| | | |
|---|---|---|
| 2017/0353373 A1 | 12/2017 | Agarwal et al. |
| 2018/0124139 A1 | 5/2018 | Jiang et al. |
| 2018/0241622 A1* | 8/2018 | Chanda .................. H04L 41/12 |
| 2019/0171966 A1 | 6/2019 | Rangasamy |
| 2019/0173757 A1 | 6/2019 | Hira et al. |
| 2019/0173780 A1 | 6/2019 | Hira et al. |
| 2019/0215281 A1 | 7/2019 | Vallala et al. |
| 2019/0327112 A1* | 10/2019 | Nandoori .............. H04L 47/125 |
| 2020/0014594 A1 | 1/2020 | Lapiotis et al. |
| 2021/0073034 A1 | 3/2021 | Bliesner et al. |
| 2021/0168125 A1 | 6/2021 | Vemulpali |
| 2021/0240817 A1 | 8/2021 | Duan et al. |
| 2021/0374175 A1 | 12/2021 | Luthy |
| 2022/0091868 A1 | 3/2022 | Malleni et al. |
| 2022/0147541 A1 | 5/2022 | Mallipeddi et al. |
| 2022/0210053 A1 | 6/2022 | Du |

\* cited by examiner

```
(vim.vm.InstantCloneSpec) {
  name = 'esx-10884925',
  location = (vim.vm.RelocateSpec) {
   folder = 'vim.Folder:group-v16334',
     (vim.vm.device.VirtualDeviceSpec) {
      operation = 'edit',
      device = (vim.vm.device.VirtualVmxnet3) {
       key = 4002,
       deviceInfo = (vim.Description) {
        label = 'Network adapter 3',
        summary = 'nsx.LogicalSwitch: 3e38b93a-2622-4608-8125-4fbff0bd657b'
       },
       backing = (vim.vm.device.VirtualEthernetCard.OpaqueNetworkBackingInfo) {
          opaqueNetworkId = u'b75fc9e4-9e63-415f-bb1b-032d9402622c',
          opaqueNetworkType = 'nsx.LogicalSwitch'
       },
       controllerKey = 100,
       addressType = 'manual',
       macAddress = '00:50:56:bd:91:fb',
      },
     }
    ],
   },
```

FAST PROVISIONING OF MACHINES USING NETWORK CLONING

BACKGROUND

Today, there are multiple options available for rapid provisioning of virtual machines, such as links clones and instant clones. However, the techniques used for these options come with a variety of impediments. Often, the techniques are inefficient due to power cycling requirements for the cloned virtual machines and guest customization requirements to refresh the networking stack. Additionally, the applications running in the guest operating systems of the virtual machines require changes to adapt to the updated networking stack, and applications running on multiple virtual machines may require updates to their dependencies (e.g., connection endpoints, certificates, etc.).

BRIEF SUMMARY

Some embodiments of the invention provide a method for a cloning mechanism that clones a set of one or more applications implemented by a first set of machines connected through a first logical network that defines a virtual private cloud in a set of one or more datacenters. The cloning mechanism instantiates a cloned, second set of machines that is a replicated copy of the first set of machines. The cloning mechanism identifies a set of network configuration data that configures a set of logical forwarding elements (LFEs) of the first logical network, and uses the identified set of configuration data to define a cloned, second logical network to connect the cloned, second set of machines.

In some embodiments, the cloning mechanism uses the identified set of network configuration data to define the cloned, second logical network to connect the cloned, second set of machines by preserving a networking stack of the first set of machines that implement the set of applications. Preserving the networking stack, in some embodiments, enables a rapid deployment of the cloned, second logical network by eliminating any guest customization required for continuous execution of the set of applications running on the cloned, second set of machines. The networking stack is preserved, in some embodiments, by ensuring that each element in the cloned, second logical network is an exact replica of each element in the first logical network.

The cloned, second set of machines, in some embodiments, are identical to the first set of machines in processor state, virtual device state, memory state, disk state, and guest operating system. In some embodiments, the cloned, second set of machines are replicated from the first set of machines while the first set of machines is still running (i.e., powered on and executing CPU instructions). In other embodiments, the cloned, second set of machines are replicated from the first set of machines while the first set of machines is frozen (i.e., powered on, but not yet executing CPU instructions). The machines, in some embodiments, can include virtual machines (VMs), containers, and pods.

In some embodiments, the cloning mechanism uses a dynamic host configuration protocol (DHCP) service of the first logical network to create port mappings with static bindings to retain, for the cloned, second logical network, layer 2/layer 3 (L2/L3) address mappings for a set of private L2/L3 addresses allocated in the first logical network. In some embodiments, the L2/L3 address mappings map L2/L3 addresses to virtual interfaces (VIFs) associated with each machine in the cloned, second set of machines. The set of private L2/L3 addresses are then removed from a network address pool of a DHCP server created for the cloned, second logical network, according to some embodiments. As a result, the cloned, second set of machines do not have to learn new L2/L3 address mappings.

To identify the set of network configuration data, in some embodiments, the cloning mechanism first identifies the set of LFEs configured by the set of network configuration data. These LFEs can include logical switches and logical routers, in some embodiments. The cloning mechanism then locates, in a storage structure that stores network configuration data for one or more logical networks, a set of one or more files associated with the identified set of LFEs and that stores the set of network configuration data, according to some embodiments. The set of one or more files, in some embodiments, also store one or more sets of network configuration data for configuring multiple other logical network components of the first logical network. Examples of such other logical network components, in some embodiments, include dynamic host configuration protocol (DHCP) servers, port bindings, network address pools, middlebox service rules, middlebox service states, and VIFs.

In order to use the set of network configuration data to define the cloned, second logical network, in some embodiments, the cloning mechanism replicates the one or more files located in the storage structure. As a result, the cloned, second logical network includes replicated versions of the set of LFEs and the multiple other logical network components, in some embodiments, with each LFE and logical network component being an exact copy of and having the same exact same configuration as its parent component in the first logical network. In some embodiments, the first logical network and cloned, second logical network connect to the same gateway router that connects both the first logical network and cloned, second logical network to an external network that is different than the first logical network and cloned, second logical network.

In some embodiments, once the cloned, second logical network is defined, network traffic intended for the first logical network is directed instead to the cloned, second logical network in order for a software update to be performed for one or more elements of the first logical network without any service interruptions. Once the software update to the one or more elements is completed, the network traffic is redirected back to the first logical network, in some embodiments. Alternatively, in some embodiments, the cloned, second logical network is used to test a software upgrade intended for one or more elements of the first logical network. Upon successful testing in the cloned, second logical network, the software upgrade is then performed on elements of the first logical network, and the cloned, second logical network is terminated.

The cloned, second logical network, in some embodiments, is one of a set of cloned logical networks, with each cloned logical network in the set being a replicated copy of the first logical network. In some embodiments, each of the cloned logical networks includes a cloned set of machines that is a replicated copy of the first set of machines and that implements the set of applications, and a continuous integration and continuous development (CI/CD) pipeline. Each of the CI/CD pipelines of each of the cloned logical networks in the set is then used to test a software upgrade for a particular application in the set of applications, in some embodiments, and upon successful testing, the software upgrade is then performed on the particular application implemented by the first set of machines of the first logical network. In some embodiments, the set of cloned logical networks are subsequently terminated.

Alternatively, prior to instantiating the cloned, second set of machines, some embodiments first detect that the first logical network does not have enough resources to process a set of network traffic destined for the first logical network (i.e., during an influx of network traffic). Based on that detection, some embodiments provide additional resources by generating one or more replicated copies of the first logical network (e.g., the cloned, second logical network) to process the set of network traffic. In some embodiments, the cloned logical networks are only needed for a specific period of time, and after that period of time elapses, these cloned logical networks are terminated.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

BRIEF DESCRIPTION OF FIGURES

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a method for a cloning mechanism ("Instapp") that clones a set of one or more applications implemented by a first set of machines connected through a first logical network that defines a virtual private cloud in a set of one or more datacenters. The cloning mechanism instantiates a cloned, second set of machines that is a replicated copy of the first set of machines. The cloning mechanism identifies a set of network configuration data that configures a set of logical forwarding elements (LFEs) of the first logical network, and uses the identified set of configuration data to define a cloned, second logical network to connect the cloned, second set of machines.

In some embodiments, the cloning mechanism uses the identified set of network configuration data to define the cloned, second logical network to connect the cloned, second set of machines by preserving a networking stack of the first set of machines that implement the set of applications. Preserving the networking stack, in some embodiments, enables a rapid deployment of the cloned, second logical network by eliminating any guest customization required for continuous execution of the set of applications running on the cloned, second set of machines. The networking stack is preserved, in some embodiments, by ensuring that each element in the cloned, second logical network is an exact replica of each element in the first logical network.

The cloned, second set of machines, in some embodiments, are identical to the first set of machines in processor state, virtual device state, memory state, disk state, and guest operating system. In some embodiments, the cloned, second set of machines are replicated from the first set of machines while the first set of machines is still running (i.e., powered on and executing CPU instructions). In other embodiments, the cloned, second set of machines are replicated from the first set of machines while the first set of machines is frozen (i.e., powered on, but not yet executing CPU instructions). In the examples described below, the cloned machines are virtual machines (VMs), although one of ordinary skill will realize that other embodiments are used to quickly provision other types of machines, such as Pods or containers.

Figure 1:
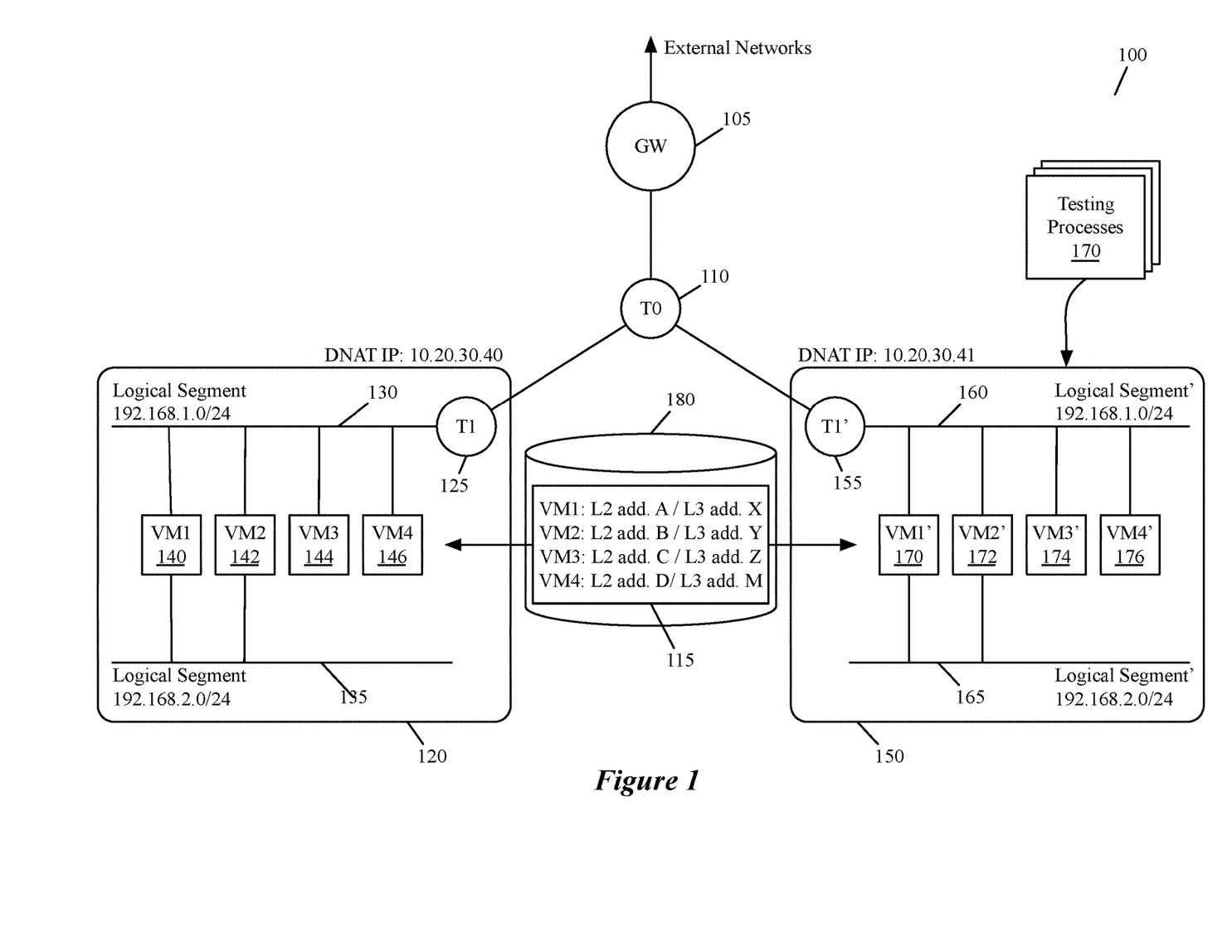
FIG. 1 conceptually illustrates a diagram showing a parent logical network topology and a cloned logical network topology that is identical to the parent logical network topology, in some embodiments.

FIG. 1 illustrates a diagram showing a parent logical network topology and a cloned logical network topology that is identical to the parent logical network topology, in some embodiments. As shown, the parent logical network 120 includes a tier-1 logical router 125, logical segments (e.g., logical switches) 130 and 135, and VMs 140, 142, 144, and 146. Each of the VMs 140-146 connect to the logical segment 130, while only VMs 140 and 142 connect to the logical segment 135.

In some embodiments, when a logical network is cloned, the entire topology from the tier-1 logical router down is cloned. As a result, the cloned logical network 150 includes a tier-1 logical router 155 that is an exact replica of the tier-1 logical router 125, logical segments 160 and 165 that are exact replicas of the logical segments 130 and 135, and VMs 170, 172, 174, and 176 that are exact replicas of the VMs 140-146. As such, each of the VMs 170-176 connect to the logical segment 160, while only the VMs 170 and 172 connect to the logical segment 165. The parent logical network 120 and the cloned logical network 150 connect to the same gateway logical router (i.e., tier-0 logical router) 110 via their respective tier-1 logical routers 125 and 155. The gateway logical router 110 connects the logical networks to a gateway 105 which provides access to external networks, and provides the external networks access to the logical networks 120 and 150, in some embodiments.

In addition to being exact replicas of their counterparts in the parent logical network 120, each element in the cloned logical network 150 is allocated the same network address as their respective counterparts. As shown, the logical segments 130 and 160 both have the IP address 192.168.1.0/24 and the logical segments 135 and 165 both have the IP address 192.168.2.0/24. Additionally, as indicated by the L2/L3 address bindings 115 in the storage 180, the VMs 140 and 170 are allocated the same L2/L3 addresses A/X, the VMs 142 and 172 are allocated the same L2/L3 addresses B/Y, the VMs 144 and 174 are allocated the same L2/L3 addresses C/Z, and lastly the VMs 146 and 176 are allocated the same L2/L3 addresses D/M.

By allocating the same network addresses to the cloned elements as are allocated to the parent elements, in addition to preserving the states and guest operating systems of the parent elements, some embodiments ensure that the cloned elements do not have to learn any new network address mappings, and the cloned logical network can begin running as soon as it is created. To access the cloned networks, a user (e.g., network administrator) must provide at least one or more additional externally routable IP addresses. In some embodiments, the user can choose to assign these external IP addresses to machines of their choice for access purposes, and upon completion of the cloning, the cloning mechanism allocates these external IP addresses to the chosen VMs via DNAT (destination network address translation) configuration on the tier-1 logical router to provide external access.

In some embodiments, the cloned logical network 150 can be used to assist with software upgrades, new software releases, patches, etc. intended for the parent logical network 120. These upgrades, releases, patches, etc., in some embodiments, can be system-wide, for specific network elements (e.g., a particular logical switch), for groups of network elements (e.g., all logical forwarding elements), etc. For example, once the cloned logical network 150 is defined, network traffic intended for the parent logical network 120 is redirected to the cloned logical network 150, in some embodiments, and a software upgrade is performed for the parent logical network 120. In some embodiments, this allows for upgrades to occur without any service interruptions.

Once the software upgrade is completed for the parent logical network 120, in some embodiments, the network traffic is directed back to the parent logical network 120 from the cloned logical network 150. Alternatively, in some embodiments, the cloned logical network 150 is used to test the software upgrade intended for the parent logical network 120, and upon successful testing in the cloned logical network 150, the software upgrade is subsequently performed for the parent logical network 120, and the cloned logical network 150 is terminated.

For example, in some embodiments, the testing processes 170 can represent software upgrades intended for the parent logical network 120. Alternatively, or conjunctively, the testing processes 170, in some embodiments, can also represent applications to be tested in the cloned logical network 150 before they are implemented in the parent logical network 120 by the VMs 140-146. Because the cloned logical network 150 is an exact replica of the parent logical network 120, and therefore runs exactly like the parent logical network, upgrade, application, and other tests that are run in the cloned logical network 150 provide ample and accurate insight into how these upgrades, applications, and other tests would perform in the parent logical network 120.

In another example, for a typical CI/CD pipeline, once a new build (e.g., new software product) is introduced, multiple workloads are triggered to run certain jobs (i.e., to test the build). All of these workloads use the same set of builds and deploy appliances needed by the topology of the logical network, according to some embodiments. In some embodiments, when there are multiple jobs to be performed, only the first job deploys the parent logical network 120, while each of the other jobs are cloned from the parent logical network. As such, in some embodiments, the cloned logical network 150 may belong to a set of cloned logical networks, with each cloned logical network in the set being a replicated copy of the parent logical network 120 and intended to perform one of the jobs triggered by the introduction of the new build.

In some embodiments, using cloned logical networks to perform the triggered jobs saves a significant amount of time. For example, if a build triggers 10 jobs and each job takes 30 minutes to deploy, the parent logical network 120 would spend 300 minutes for deployment without use of the cloned logical networks. In some embodiments, a cloned logical network can be created (i.e., replicated and deployed) in less than one minute. As a result, the deployment of 9 cloned logical networks for the 9 remaining jobs (i.e., with the parent logical network being deployed for the first of the 10 jobs) would take just 9 minutes compared to 270 minutes (i.e., with the first 30 minutes of the total 300 minutes being spent deploying the parent logical network).

For each of the upgrade examples described above, the logical network that is not receiving the upgrade is subsequently updated to reflect any operations performed by the logical network that is servicing network traffic while the software upgrade is performed on the other logical network, in some embodiments. For instance, once a software upgrade for the parent logical network is completed, it is updated to reflect any operations performed by the cloned logical network(s) as though the parent logical network itself performed the operations, and can then continue to provide uninterrupted services. Examples of operations performed by elements of the logical network, in some embodiments, can include L2/L3 lookups, tunnel termination/encapsulation, firewall processing, packet updating, byte counters, layer 7 (L7) firewall services, transport layer security (TLS) services, L7 load balancing services, uniform resource locator (URL) filtering, domain name service (DNS), and forwarding and logical switching and logical routing operations.

In some embodiments, a web frontend (e.g., Jarvis) is used to allow users (e.g., network administrators) to deploy logical network topologies on public or private cloud datacenters (e.g., VMware, Inc.'s Nimbus PODS). To deploy a logical network topology on a public or private cloud datacenter, some embodiments use an underlying framework such as VDNet, which can also provide configuration management. In some embodiments, before a request is sent to a public or private cloud datacenter to deploy a logical network, the request is sent to a scheduler that adds the request to a distributed messaging system queue (e.g., a Kafka queue) followed by any other incoming requests. The request, in some embodiments, is subsequently retrieved by a dequeuer module of a load balancer that manages private datacenters, such as Tardis. The dequeuer then processes the retrieved request and calls the load balancer module to allocate a cloud datacenter for the request, according to some embodiments.

The load balancer module, in some embodiments, calculates the resources needed for the request and identifies the best available cloud datacenter to run the request. In some embodiments, the dequeuer then runs the request on the cloud datacenter allocated by the load balancer module. For cloning requests (e.g., Instapp requests), the load balancer module finds the cloud datacenter in which the parent logical network is deployed, and deploys cloned logical network on that cloud datacenter, according to some embodiments. Additional details regarding the creation of the cloned logical network and allocation of network addresses to elements of the cloned logical network will be further described below.

Figure 2:
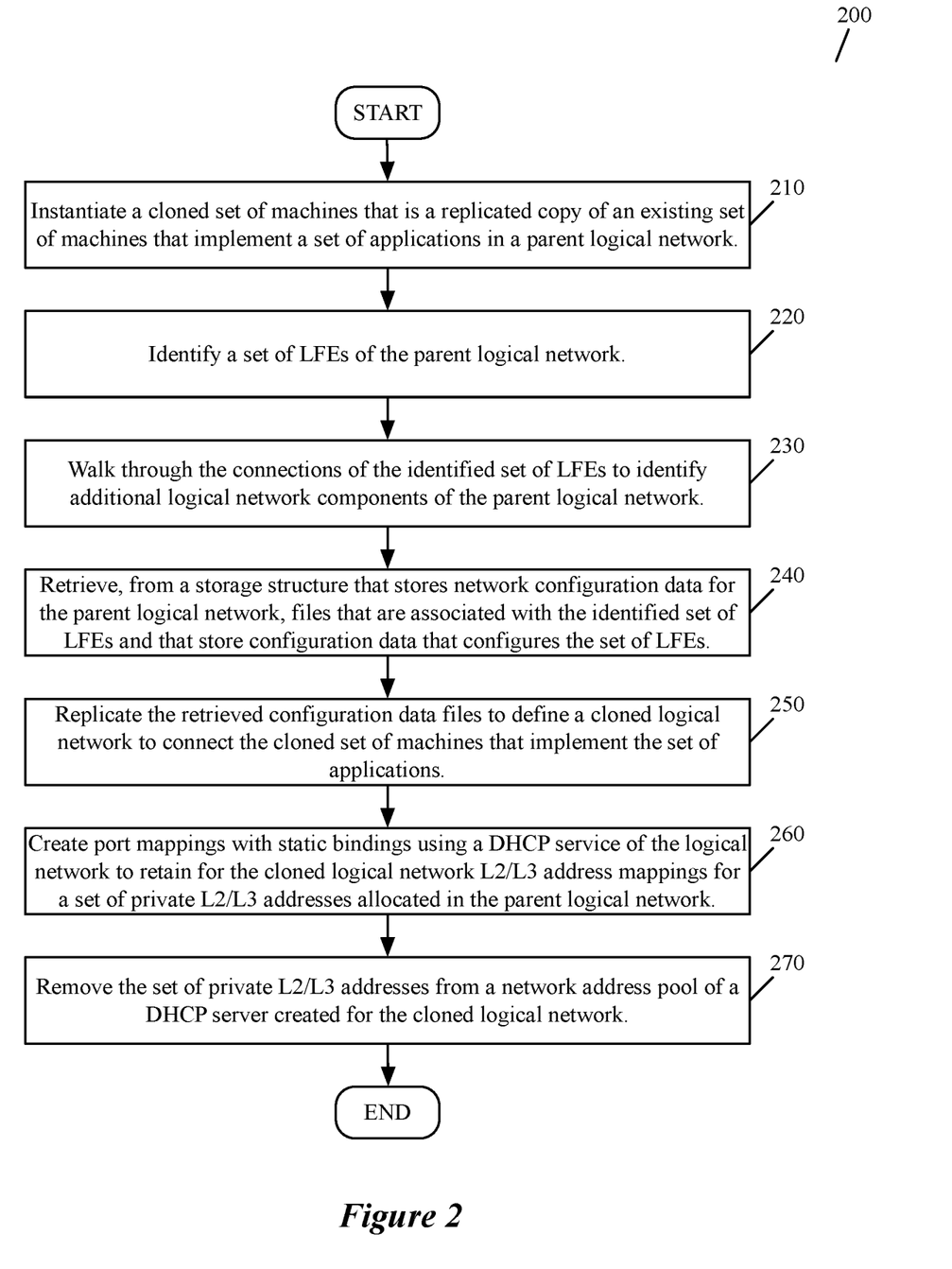
FIG. 2 conceptually illustrates a process for cloning a logical network, in some embodiments.

FIG. 2 illustrates a process for cloning a logical network, in some embodiments. The process 200 is performed, in some embodiments, by Instapp, an instant cloning mechanism, as described above. The process 200 starts by instantiating (at 210) a cloned set of machines that is a replicated copy of an existing set of machines that implement a set of applications in a parent logical network. The cloned set of machines, in some embodiments, are identical to the parent set of machines in processor state, virtual device state, memory state, disk state, and guest operating system.

Figure 4:
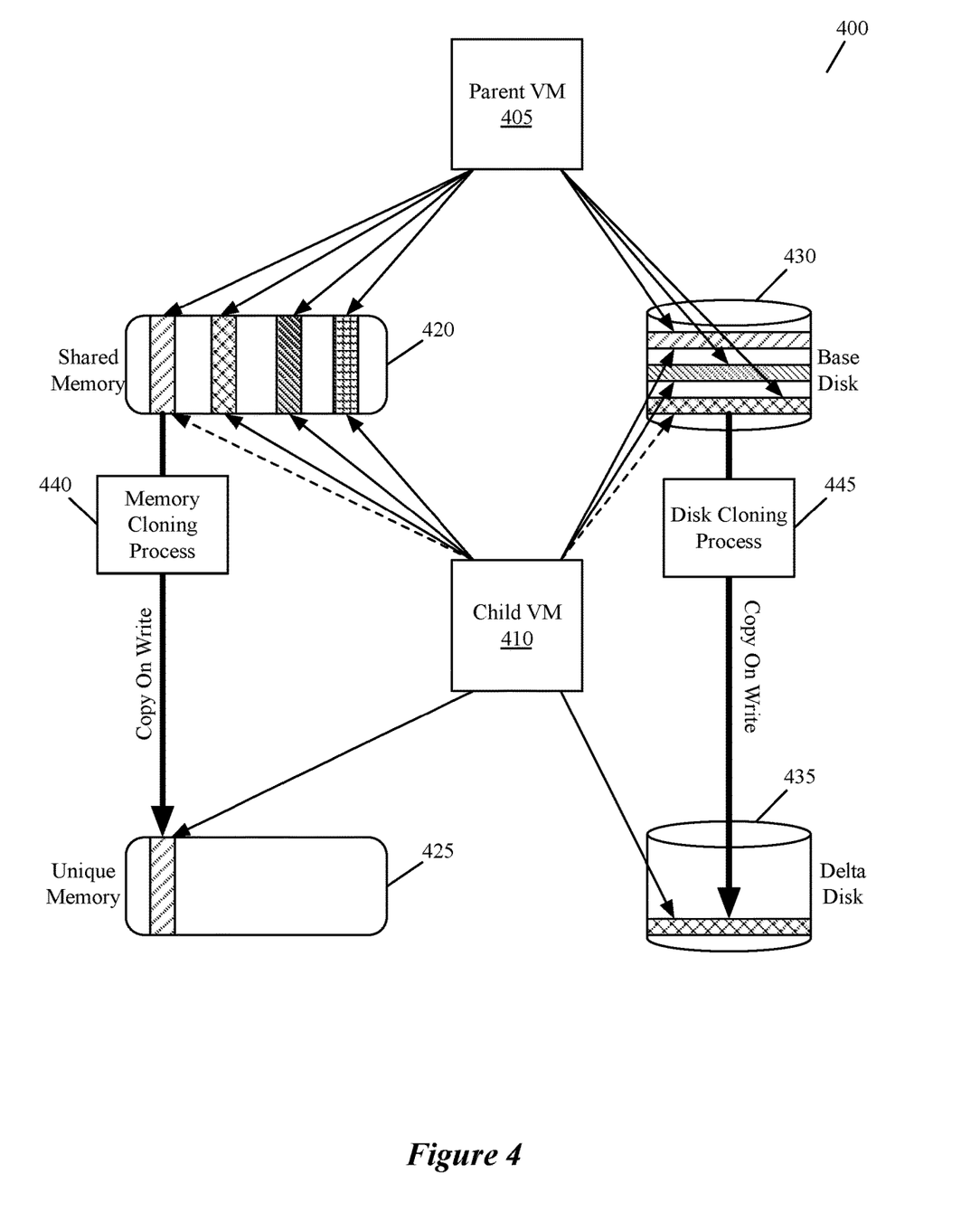
FIG. 4 conceptually illustrates a diagram of a workflow for replicating a parent VM to create a cloned VM (i.e., child VM), in some embodiments.

FIG. 4, for example, illustrates a diagram 400 of a workflow for replicating a parent VM to create a cloned VM (i.e., child VM), in some embodiments. As shown, a memory cloning process 440 copies data from the shared memory 420 of the parent VM 405 and child VM 410 and writes the data to the unique memory 425 of the child VM 410. Similarly, a disk cloning process 445 copies data from the base disk 430 and writes the data to the delta disk 435 of the child VM 410. The memory cloning process 440 and disk cloning process 445, in some embodiments, are sub-processes of the cloning mechanism.

In some embodiments, the memory cloning process 440 and disk cloning process 445 operate while the parent VM 405 is in a frozen state (i.e., powered on, but not currently executing any CPU instructions), while in other embodiments, the memory cloning process 440 and disk cloning process 445 operate while the parent VM 405 is still running. Once all of the data from the shared memory 420 and base disk 430 has been copied by the memory cloning process 440 and disk cloning process 445 and written to the unique memory 425 and delta disk 435 of the cloned VM 410, the parent VM 405 and cloned VM 410 no longer have any dependencies on each other and can begin to operate separately from the same starting points, according to some embodiments. That is, once the cloning processes have completed, in some embodiments, the parent VM 405 and cloned VM 410 do not maintain the same processor states, virtual device states, memory states, or disk states.

Returning to the process 200, the process identifies (at 220) a set of LFEs of the parent logical network, and walks through (at 230) the connections of the identified set of LFEs to identify additional logical network components of the parent logical network. For instance, in the diagram 100 described above, the process would walk through all of the connections from the tier-1 logical router 125 and logical segments (e.g., logical switches Examples of LFEs in some embodiments can include logical switches and logical routers, while examples of additional logical network components, in some embodiments, include DHCP servers, port bindings, network address pools, middlebox service rules, middlebox service states, and VIFs.

The process retrieves (at 240), from a storage structure that stores network configuration data for the parent logical network, files that are associated with the identified set of LFEs and additional logical network components and that store configuration data that configures the set of LFEs and additional logical network components. The network configuration data, in some embodiments, is stored in folders by a server or server set. In some embodiments, this network configuration data is grouped under a VM folder, or series of VM folders, stored by the server set.

Next, the process replicates (at 250) the retrieved configuration data files to define a cloned logical network to connect the cloned set of machines that implement the set of applications. In some embodiments, the network configuration data in the retrieved folders is replicated and placed in new VM folders. The replication, in some embodiments, is performed in a matter of seconds (e.g., ~1 second per VM).

Figure 3:
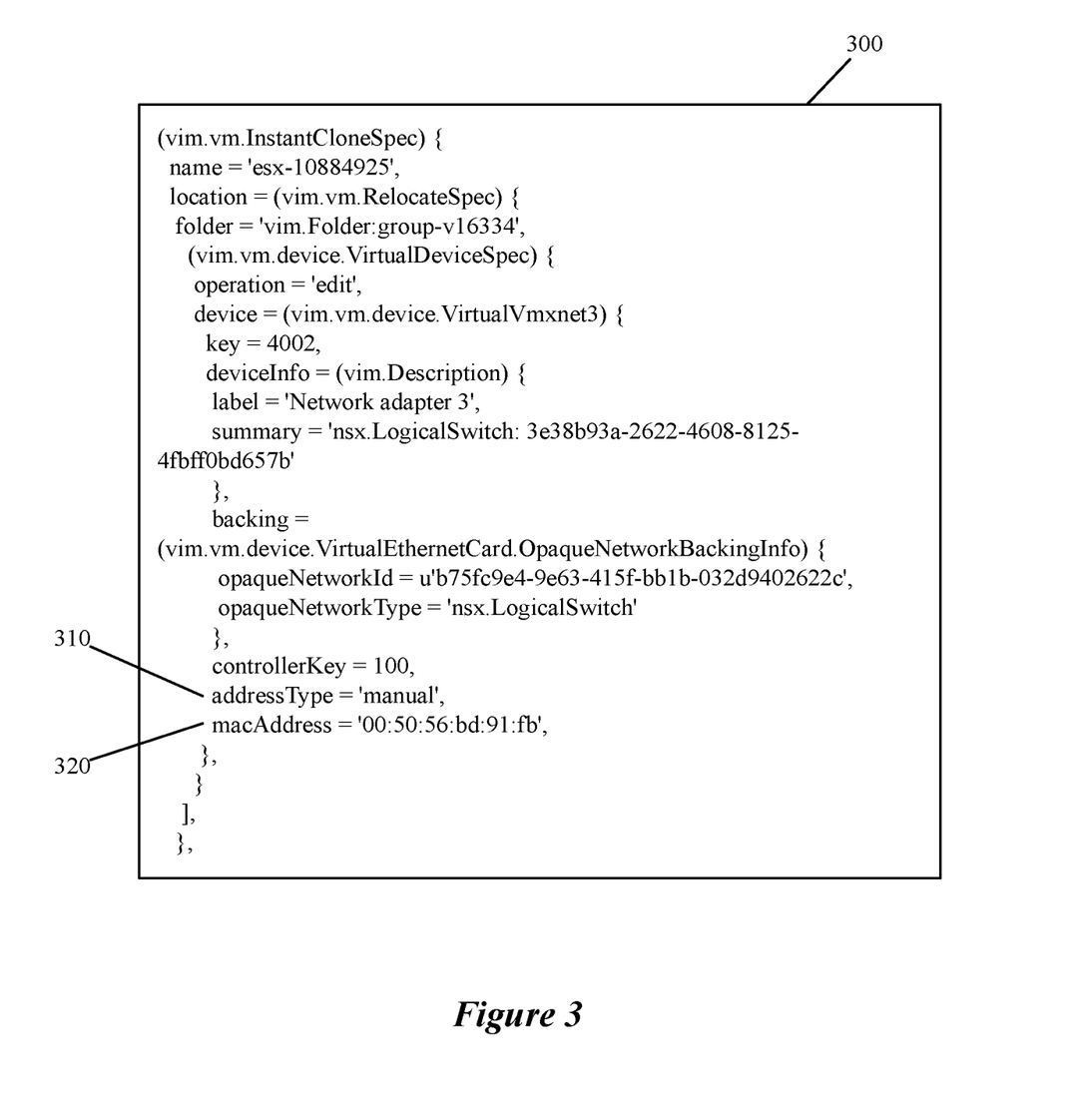
FIG. 3 conceptually illustrates a portion of a configuration specification used for performing instant cloning, in some embodiments.

FIG. 3, for example, illustrates a portion of a configuration specification 300 used for performing instant cloning, in some embodiments. As shown, the configuration specification 300 indicates the location of the specification, the specific folder, and additional details regarding the device. Additionally, the network backing illustrated points to a newly created logical switch in a datacenter.

Returning to the process 200, the process creates (at 260) port mappings with static bindings to retain, for the cloned logical network, layer 2/layer 3 (L2/L3) address mappings for a set of private L2/L3 addresses allocated in the parent logical network. In some embodiments, the L2/L3 address mappings map L2/L3 addresses to virtual interfaces (VIFs) associated with each machine in the cloned, second set of machines. The configuration specification 300, for instance, has the "addressType" at 310 set to "manual" with the "macAddress" at 320 being the same as in the parent topology. Because the cloned VM is backed by a different logical switch than the parent VM, there is no IP address conflict because the VMs are in different broadcast domains.

The process removes (at 270) the set of private L2/L3 addresses from a network address pool of a DHCP server created for the cloned logical network, according to some embodiments. As a result, the cloned set of machines do not have to learn new L2/L3 address mappings, and new VMs instantiated in the cloned logical network retrieve and are assigned network addresses in the same manner as in the parent logical network.

Figure 5:
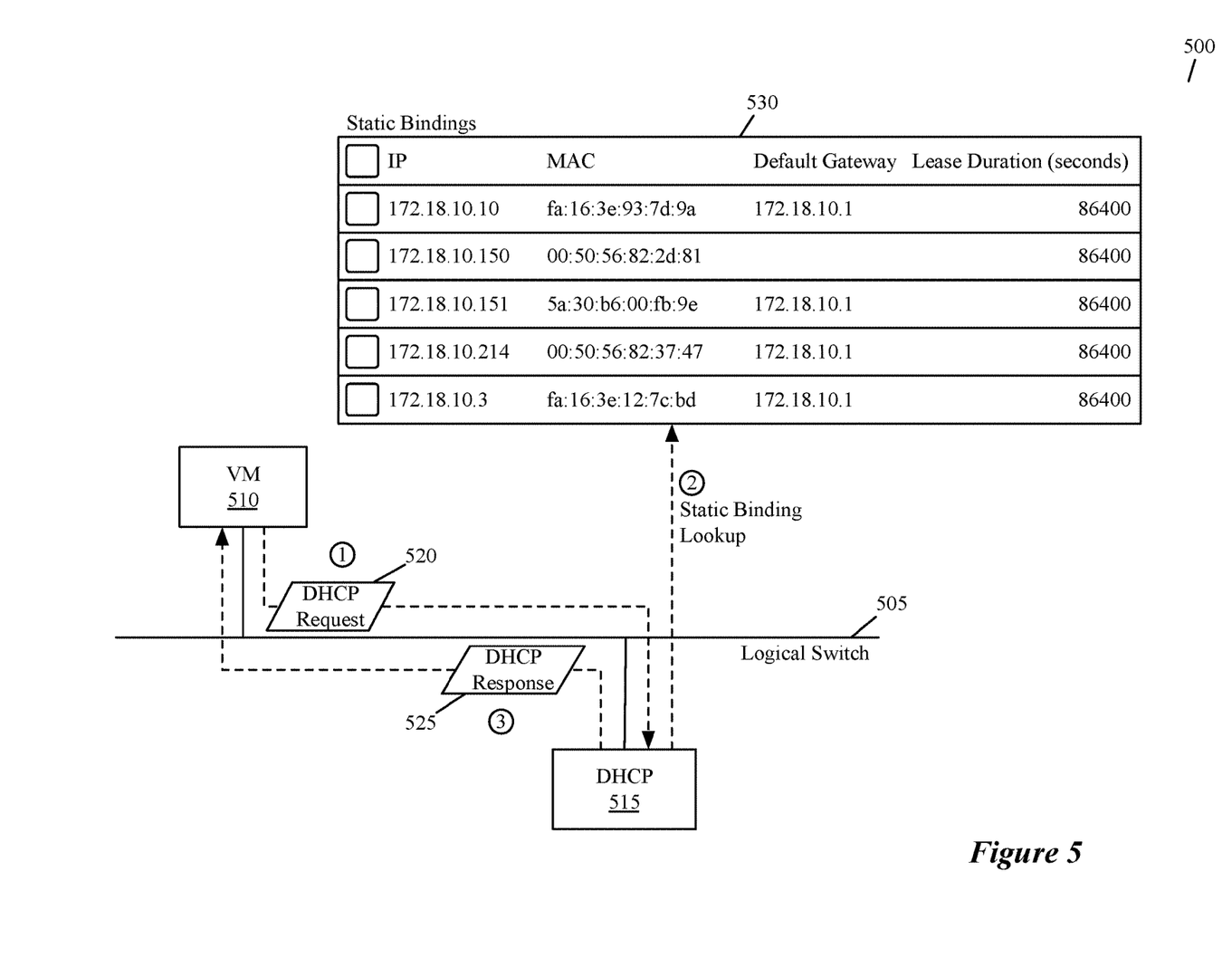
FIG. 5 conceptually illustrates a diagram showing how static bindings created to preserve the L2/L3 addresses ensure there are no changes detected by the guest operating system of a VM that uses DHCP, in some embodiments.

FIG. 5, for instance, illustrates a diagram 500 that shows how the static bindings created to preserve the L2/L3 addresses ensures there is no changes detected by the guest operating system of a VM that uses DHCP, in some embodiments. As illustrated, a VM 510 and DHCP server 515 are connected by a logical switch 505. The VM 510 sends a DHCP request 520 to the DHCP server 515 via the logical switch 505. The DHCP server 515 then performs a static binding lookup in the static bindings table 530, which specifies mappings of IP and MAC addresses, their corresponding default gateways, and the duration (in seconds) of the lease of those addresses. The DHCP server 515 then provides a DHCP response 525 to the VM 510. Returning to the process 500, following 270, the process 200 ends.

Figure 6:
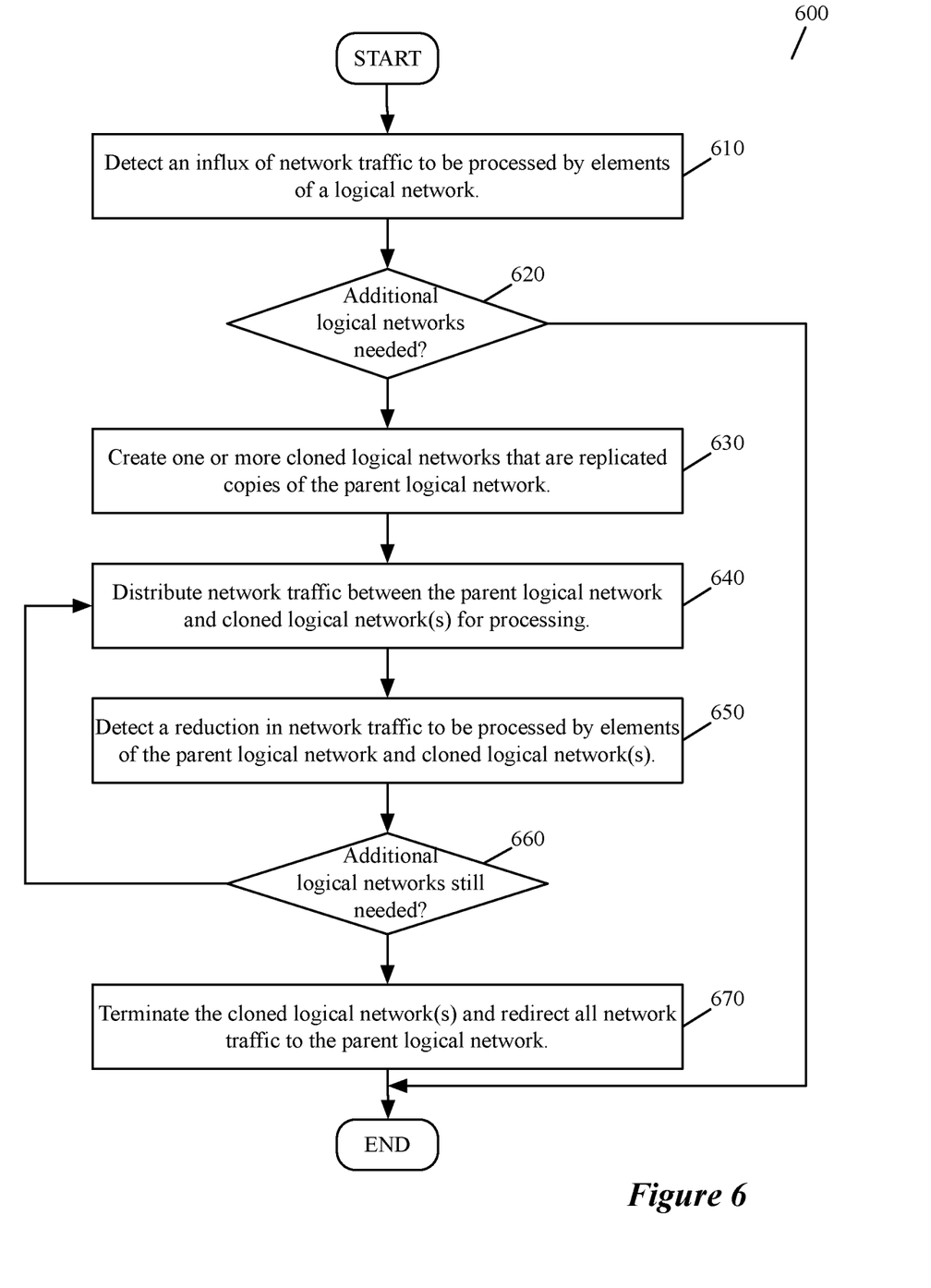
FIG. 6 conceptually illustrates a process performed in some embodiments to increase the number of logical networks available to process network traffic.

FIG. 6 illustrates a process performed in some embodiments to increase the number of logical networks available to process network traffic. The process 600 will be described below with reference to FIG. 7, which illustrates a set of diagrams 701 and 702 before and after a cloned logical network is created to assist with processing network traffic.

Figure 7:
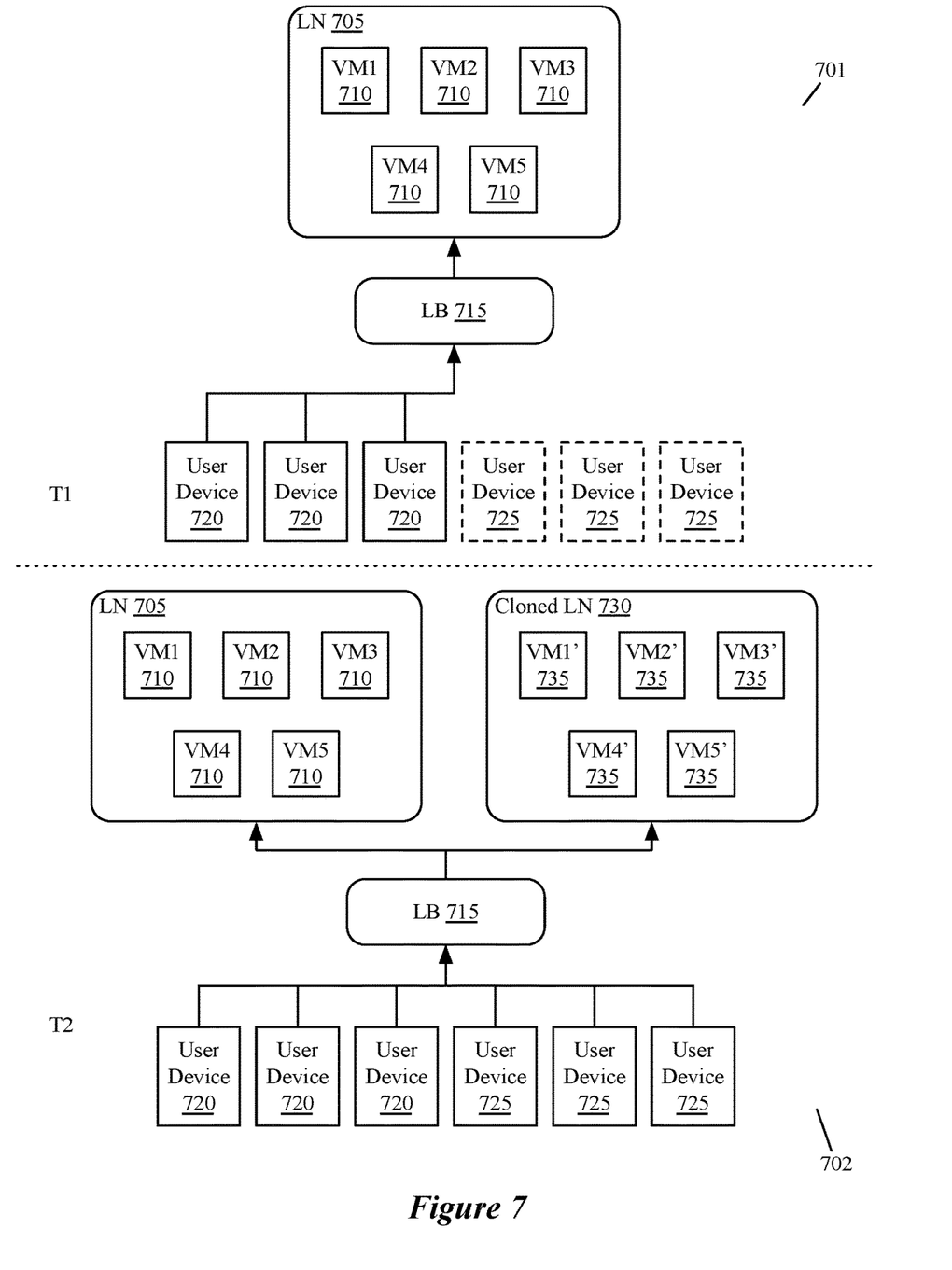
FIG. 7 conceptually illustrates a set of diagrams before and after a cloned logical network is created to assist with processing network traffic, in some embodiments.

The process 600 starts by detecting (at 610) an influx of network traffic to be processed by elements of a parent logical network. For instance, the diagram 701 illustrates a logical network 705 at time T1. The logical network 705 includes a set of VMs 710 for servicing user devices 720. A front-end load balancer 715 receives network traffic from the user devices 720 and directs the network traffic to the VMs 710 of the logical network 705.

In addition to the user devices 720, more user devices 725 are shown with a dashed outline to represent new user devices that will start to send network traffic to the logical network 705. In some embodiments, for example, the new user devices 725 may appear during a planned or unplanned event (e.g., a concert, peak business hours at a shopping center, etc.), and cause an increase in network traffic sent to the logical network 705.

The process determines (at 620) whether additional logical networks are needed to process the influx of network traffic. In some embodiments, this determination is made based on a guaranteed service level agreement (SLA). For instance, an SLA may guarantee a certain amount of bandwidth, and in order to meet the SLA for multiple users, additional logical networks may be created to provide additional bandwidth. When the process determines (at 620) that no additional logical networks are needed, the process ends.

When the process determines (at 620) that additional logical networks are needed to process the influx of network traffic, the process transitions to create (at 630) one or more cloned logical networks that are replicated copies of the parent logical network. Some embodiments perform the process 200 described above to clone the parent logical network. In some embodiments, the process 200 is repeated to create multiple cloned logical networks based on the resource requirements for processing the network traffic. As illustrated by the diagram 702 at time T2, a cloned logical network 730 has been added to process network traffic from the user devices 720 and 725 alongside the parent logical network 705.

The process then distributes (at 640) the network traffic between the parent logical network and the cloned logical network(s) for processing. For instance, the front-end load balancer 715 is illustrated at time T2 as distributing network traffic from the user devices 720 and 725 to both the parent logical network 705 and the cloned logical network 730. While only one cloned logical network is shown, other embodiments can include any number of cloned logical networks to assist in processing the network traffic.

Next, the process detects (at 650) a reduction in the network traffic to be processed by elements of the parent logical network and cloned logical network(s). This reduction of network traffic, in some embodiments, can occur when an event ends as the number of user devices utilizing the services of the machines of the logical networks begin to taper down.

As a result of the detected reduction in network traffic, the process determines (at 660) whether the additional (i.e., cloned) logical networks are still needed. That is, the process determines whether the reduction in the network traffic is large enough to eliminate the need for the additional logical networks that were created to help process the network traffic. When the process determines (at 660) that the additional logical networks are still needed, the process returns to continue to distribute (at 640) the network traffic between the parent logical network and the cloned logical network(s).

When the process determines (at 660) that the additional logical networks are no longer needed, the process transitions to terminate (at 670) the cloned logical network(s) and redirect all of the network traffic to the parent logical network. Following 670, the process 600 ends.

Many of the above-described features and applications are implemented as software processes that are specified as a set of instructions recorded on a computer-readable storage medium (also referred to as computer-readable medium). When these instructions are executed by one or more processing unit(s) (e.g., one or more processors, cores of processors, or other processing units), they cause the processing unit(s) to perform the actions indicated in the instructions. Examples of computer-readable media include, but are not limited to, CD-ROMs, flash drives, RAM chips, hard drives, EPROMs, etc. The computer-readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
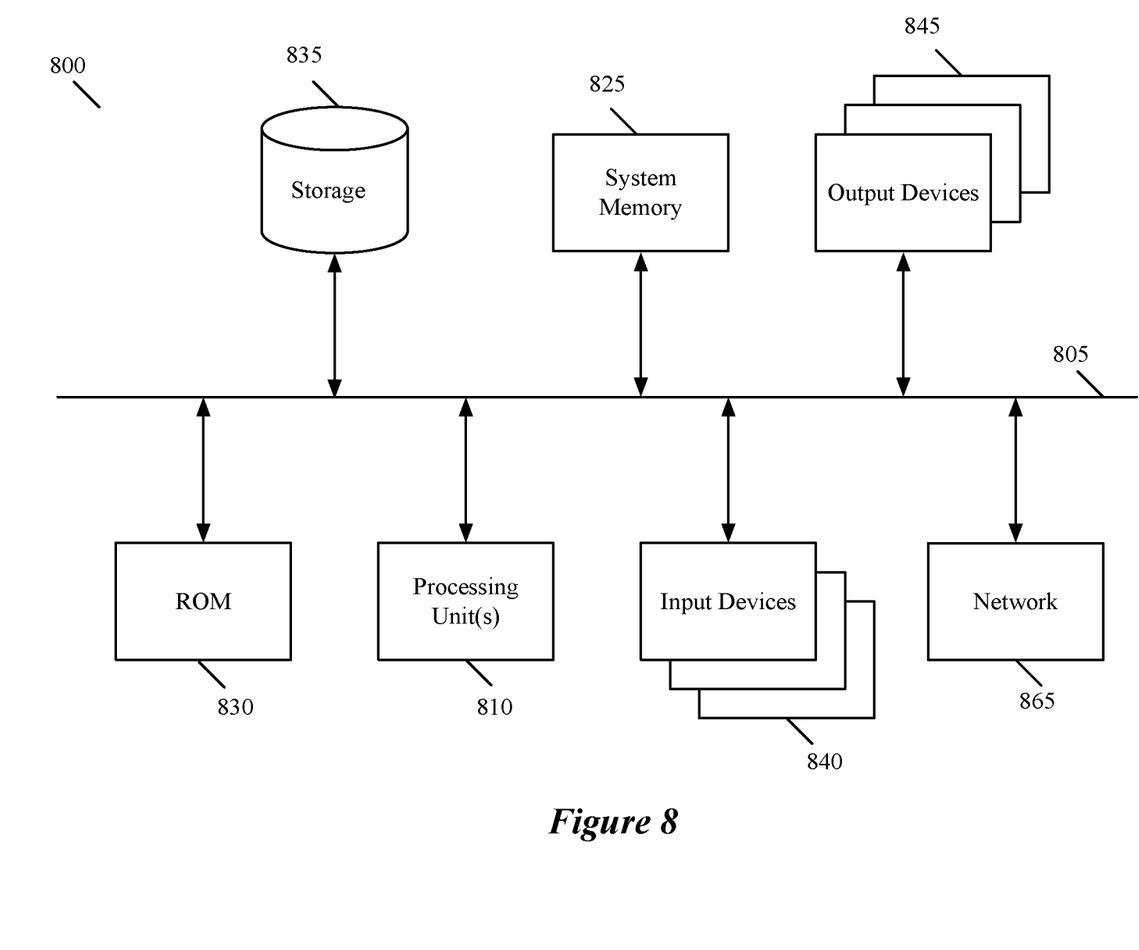
FIG. 8 conceptually illustrates a computer system with which some embodiments of the invention are implemented.

FIG. 8 conceptually illustrates a computer system 800 with which some embodiments of the invention are implemented. The computer system 800 can be used to implement any of the above-described hosts, controllers, gateway, and edge forwarding elements. As such, it can be used to execute any of the above described processes. This computer system 800 includes various types of non-transitory machine-readable media and interfaces for various other types of machine-readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) 810 may be a single processor or a multi-core processor in different embodiments. The read-only-memory (ROM) 830 stores static data and instructions that are needed by the processing unit(s) 810 and other modules of the computer system 800. The permanent storage device 835, on the other hand, is a read-and-write memory device. This device 835 is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory 825 is a volatile read-and-write memory, such as random access memory. The system memory 825 stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices 840 enable the user to communicate information and select commands to the computer system 800. The input devices 840 include alphanumeric keyboards and pointing devices (also called "cursor control devices"). The output devices 845 display images generated by the computer system 800. The output devices 845 include printers and display devices, such as cathode ray tubes (CRT) or liquid crystal displays (LCD). Some embodiments include devices such as touchscreens that function as both input and output devices 840 and 845.

Finally, as shown in FIG. 8, bus 805 also couples computer system 800 to a network 865 through a network adapter (not shown). In this manner, the computer 800 can be a part of a network of computers (such as a local area network ("LAN"), a wide area network ("WAN"), or an Intranet), or a network of networks (such as the Internet). Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms "display" or "displaying" mean displaying on an electronic device. As used in this specification, the terms "computer-readable medium," "computer-readable media," and "machine-readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

The invention claimed is:

1. A method for cloning a set of one or more applications implemented by a first set of machines connected through a first logical network that defines a virtual private cloud in a set of one or more datacenters, the method comprising:
    instantiating a cloned, second set of machines that is a replicated copy of the first set of machines;
    identifying a set of network configuration data that configures a set of logical forwarding elements (LFEs) of the first logical network; and
    using the identified set of network configuration data to define a cloned, second logical network to connect the cloned, second set of machines.

2. The method of claim 1, wherein:
    using the identified set of network configuration data to define the cloned, second logical network to connect the cloned, second set of machines comprises preserving a networking stack of the first set of machines that implement the set of applications; and
    preserving the networking stack enables a rapid deployment of the cloned, second logical network by eliminating guest customization required for continuous execution of the set of applications running on the cloned, second set of machines.

3. The method of claim 1 further comprising:
    using a DHCP service of the first logical network to create port mappings in the cloned, second logical network, wherein the port mappings are created with static bindings to retain, for the cloned, second logical network, layer 2/layer 3 (L2/L3) address mappings for a set of private L2/L3 addresses allocated in the first logical network; and
    removing the set of private L2/L3 addresses from a network address pool of a DHCP server created for the cloned, second logical network.

4. The method of claim 3, wherein based on the retained L2/L3 address mappings for the set of private L2/L3 addresses, the cloned, second set of machines do not have to learn new L2/L3 address mappings.

5. The method of claim 4, wherein the L2/L3 address mappings map L2/L3 addresses to virtual interfaces (VIFs) associated with each machine in the cloned, second set of machines.

6. The method of claim 1, wherein identifying the set of network configuration data comprises:
    identifying the set of LFEs configured by the set of network configuration data; and
    locating, in storage structure that stores network configuration data for at least the first logical network, a set of one or more files that is associated with the identified set of LFEs of the first logical network and that stores the set of network configuration data.

7. The method of claim 6, wherein the set of one or more files storing the set of network configuration data also stores network configuration data for configuring a plurality of other logical network components of the first logical network.

8. The method of claim 7, wherein the plurality of other logical network components comprises at least a dynamic host configuration protocol (DHCP) server, a network address pool, a set of middlebox service rules, middle box service states, a set of virtual network interfaces (VIFs), and port-VIF bindings.

9. The method of claim 8, wherein using the identified set of network configuration data to define the cloned, second logical network comprises replicating the set of one or more files.

10. The method of claim 9, wherein the cloned, second logical network comprises (i) a cloned, second set of LFEs that has a same configuration as the set of LFEs of the first logical network, (ii) a cloned, second plurality of other logical network components that has a same configuration as the plurality of other logical network components of the first logical network, and (iii) the cloned, second set of machines that has a same configuration as the first set of machines.

11. The method of claim 1, wherein the cloned, second set of machines are identical to the first set of machines in (i) processor state, (ii) virtual device state, (iii) memory state, (iv) disk state, and (v) guest operating system.

12. The method of claim 1, wherein the first logical network and cloned, second logical network connect to a same gateway router that connects both the first logical network and cloned, second logical network to an external network that is different than the first logical network and cloned, second logical network.

13. The method of claim 1 further comprising:
directing network traffic intended for the first logical network to the cloned, second logical network;
performing a software update to one or more elements of the first logical network; and
after completing the software update to the one or more elements of the first logical network, redirecting the network traffic back to the first logical network.

14. The method of claim 1 further comprising:
using the cloned, second logical network to test a software upgrade intended for one or more elements of the first logical network;
upon successful testing, performing the software upgrade for the one or more elements of the first logical network; and
terminating the cloned, second logical network.

15. The method of claim 1, wherein the cloned, second logical network is one of a set of cloned logical networks, wherein each cloned logical network in the set is a replicated copy of the first logical network comprising (i) a cloned set of machines that is a replicated copy of the first set of machines and that implements the set of applications and (ii) a continuous integration and continuous development (CI/CD) pipeline, the method further comprising:
using each CI/CD pipeline of each cloned logical network in the set of cloned logical networks to test a software upgrade for a particular application in the set of applications; and
upon successful testing, performing the software upgrade for the particular application implemented by the first set of machines of the first logical network; and
terminating the set of cloned logical networks.

16. The method of claim 1, wherein instantiating the cloned, second set of machines comprises replicating the first set of machines while each machine in the first set of machines is running.

17. The method of claim 1, wherein instantiating the cloned, second set of machines comprises replicating the first set of machines while each machine (i) is powered on and (ii) is not running.

18. The method of claim 1, wherein the first set of machines comprise at least one of virtual machines, containers, and pods.

19. The method of claim 1, wherein the set of LFEs comprise logical switches and logical routers.

20. A non-transitory machine readable medium storing a program for execution by a set of processing units, the program for cloning a set of one or more applications implemented by a first set of machines connected through a first logical network that defines a virtual private cloud in a set of one or more datacenters, the program comprising sets of instructions for:
instantiating a cloned, second set of machines that is a replicated copy of the first set of machines;
identifying a set of network configuration data that configures a set of logical forwarding elements (LFEs) of the first logical network; and
using the identified set of network configuration data to define a cloned, second logical network to connect the cloned, second set of machines.

* * * * *